Oct. 29, 1935.　　　　J. L. WILDE　　　　2,019,108
APPARATUS FOR BLOCKING PIECES OF MEAT
Filed June 30, 1931　　　2 Sheets-Sheet 1
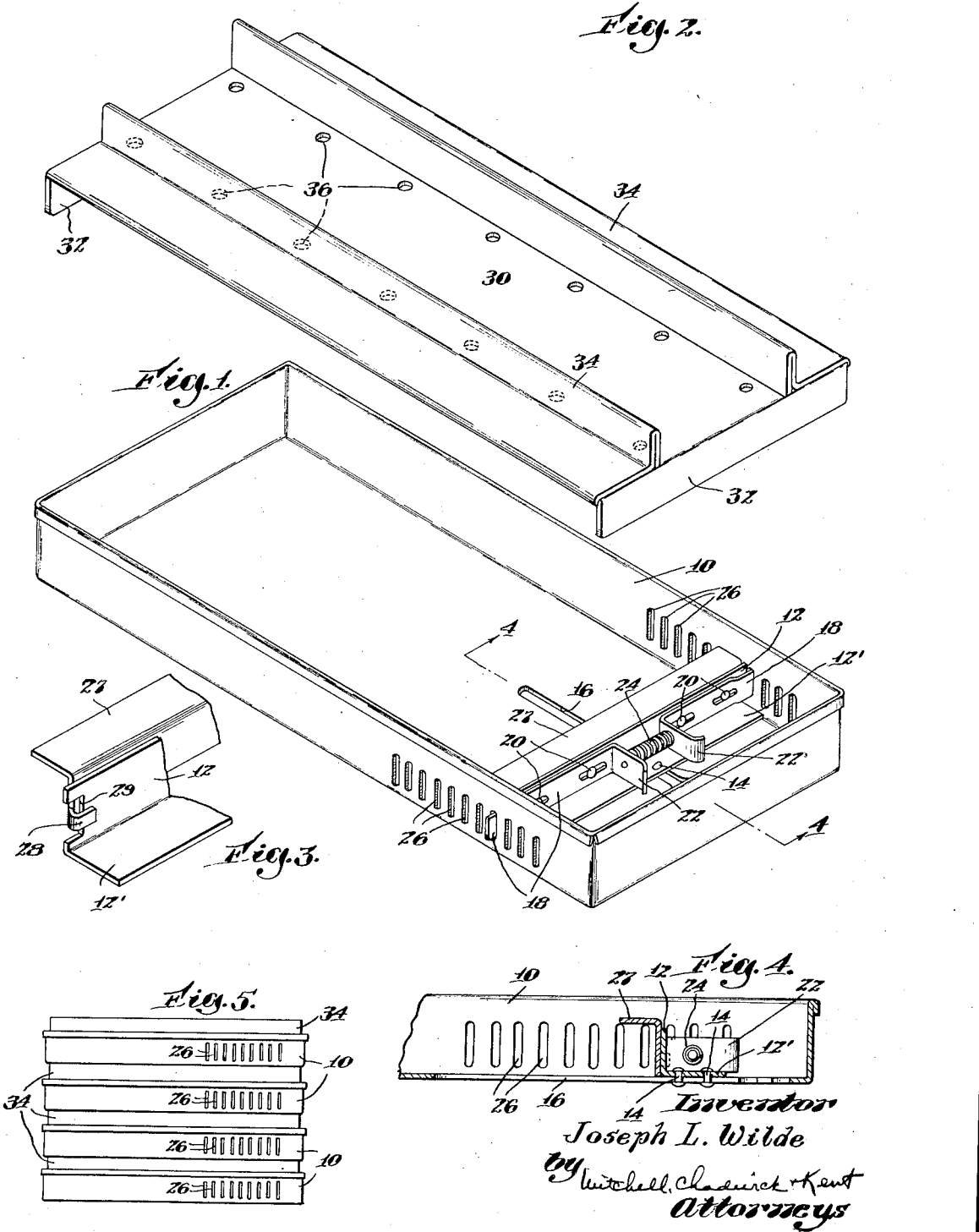

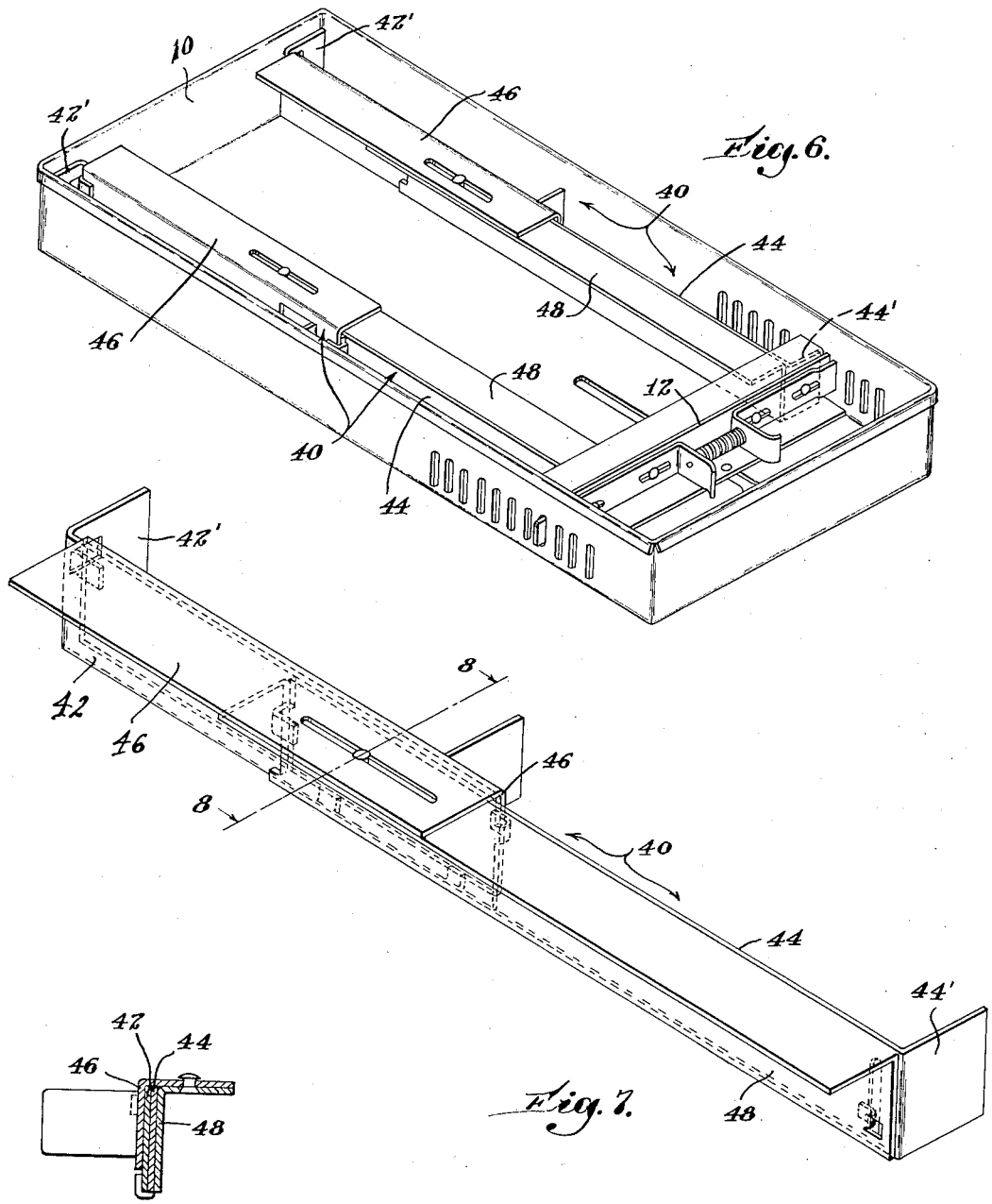

Patented Oct. 29, 1935

2,019,108

UNITED STATES PATENT OFFICE 2,019,108

APPARATUS FOR BLOCKING PIECES OF MEAT

Joseph L. Wilde, Boston, Mass.

Application June 30, 1931, Serial No. 547,883

5 Claims. (Cl. 17—1)

This invention relates to apparatus for blocking pieces of meat. More especially it provides apparatus by which pieces of irregular length, irregular width, and varying thickness may individually be blocked into approximately rectangular shapes, so that when sliced the whole of that which was an irregular piece, and which without the blocking would be subject to loss of trimmings and waste, can be utilized as first quality meat, and can be cut into slices that are uniform in aspect.

While the invention is applicable to meat of various kinds, it is particularly valuable for the handling of sides of bacon, and hence will be herein described as it may be applied to such, at a packing plant.

For commercial packing and marketing purposes it is desired to produce uniform slices from all parts of a side of bacon, but hitherto the doing of this has involved expensive preliminary trimming, for a side varies considerably in cross sectional shape and size. For example, a single side may vary in width of dimension from 11 or 12 inches near one end down to 9 to 10 inches at the other end; its end portions are normally irregular; and in thickness it may run from 3 inches at one end down to a thickness of 2 inches at the other. Other pieces may be smaller in any or all of these dimensions.

In preparation of bacon for market, the pieces (one piece being from each side of the pig between fore quarter and hind quarter so that they are called "sides", and sometimes called "bellies") are first cured for a long period in a brine, and then, after washing and drying, are smoked; after which they are de-rinded; and then, as heretofore practiced, the pieces are laid side by side on shelves in a freezing chamber, for preservation until they are brought out and sliced. The piece, already irregular in shape, and composed of different kinds of meat lying in streaks, lean and fat, becomes still further deformed through this process of curing, smoking and freezing. Moreover, the pieces of meat frequently freeze down to the shelves on which they are laid, and have to be loosened with a chisel; from which they suffer more or less damage, with further irregularity, and with wastage of meat.

The slicing is done by machines, which commonly are of standard widths, as for example to receive bacon either 10 inches, or 9 inches, or 8 inches wide. In order to fit the slicing machine, and to have the slices marketable as No. 1 grade, according to practice hitherto, each piece must be trimmed at its side edge or edges to fit the particular size of slicing machine in which the piece is to be sliced, and be trimmed at the ends so that the length of slices from that portion of the piece will be approximately the full width of the piece. Frequently ten per cent of the whole has to be removed in the trimming, and these trimmed portions have to be sold for a much lower price than can be obtained for the No. 1 grade bacon. Also there may be irregularities in the thickness of the individual pieces, such as to require certain portions to be marketed at the lower price.

It is among the objects of the invention to provide so that irregularities of dimension of a piece of meat may be eliminated without trimming the piece, but rather with a saving of the entire poundage, by making the piece into a block whose slices will be uniform in form, and with result that the whole of the piece becomes marketable as No. 1 grade.

It is a feature that the blocking begins after the pieces have been de-rinded, and that it is effected prior to and during the freezing process. It thus begins while the piece is in its most pliable state, and is maintained, by the dimensional compression and by its frozen condition, until its slicing and packing are accomplished.

One feature provides a continuing pressure on all six sides of a piece, to convert the mass into a rectangular block of meat, by reason of which continuing pressure the shape of the piece progressively improves, until it becomes fixed by the freezing. Still another feature resides in a structure of apparatus whereby contained gases slowly escape, making the meat mass of more uniformly even texture.

An important feature is that the apparatus, herein called the blockers, by which the invention is practiced, take the form of individual manually adjustable and/or self-adjusting containers, which can be stacked, and then conveniently be reversed in order of stacking. This provides and equably distributes some of the blocking pressure; permits the reshaping to continue gently and progressively; and keeps the pieces from sticking to the shelf when finally frozen.

A blocker, as herein illustrated for attaining these objects and results, has its individual pan, wherein a compressor is manually adjustable endwise of the meat piece, for engaging one end edge thereof. The interior width of pan will conform to one of the standard sizes of slicing machines. When a belly, approximating in size the dimensions of the pan, be it larger or be it smaller, is placed therein, it is re-shaped into conformity with the space provided by said end compressor (which has locking means to hold it in adjusted position), the fixed side walls, and the removable stiff cover. The latter fits loosely in the pan; resting on the bacon, and having external top longitudinal ribs, above the top of the pan, to receive weight stacked upon the blocker as a whole. Preferably, perforations in cover and in side walls, if desired, provide for escape of gases. The blockers are to be stacked on each other on a truck as they become filled, one by one, and thus there is provided vertical pressure on the contents of the under blockers, which vertical pressure becomes translated into lateral pressure throughout each plastic mass of meat, and this causes the piece to re-shape itself by flowing out laterally into any available spaces in its pan. When the loading of the truck has been completed, it is moved into the freezer; and then the removal of the blockers one by one, and their re-stacking, applies the full pressure of the stack to those which, having been on top, therefore at first had the less pressure, and have had it for the least time. Thus the vertical pressure, the plasticity of the meat, and the re-stacking, provide equable distribution of blocking pressure.

It is intended that the patent shall cover, by suitable expression in the appended claims, whatever features of patentable novelty exist in the invention disclosed.

In the accompanying drawings:

Figure 1 is an isometric view of one of my individual blocking pans, with the cover removed;

Figure 2 is a similar view of the cover;

Figure 3 is a similar view of a fragment of the compressor, showing the vertical slide connection;

Figure 4 is a section on 4—4 of Figure 1;

Figure 5 is an elevation of a stack of blockers;

Figure 6 is a view like Figure 1, but embodying a reducing device;

Figure 7 is an isometric view of the reducing devices; and

Figure 8 is a section on 8—8 of Figure 7.

Referring to the drawings the pan 10 may be of any suitable material, preferably non-corrosive metal, and may be of any suitable shape, according to the kind of meat it is to handle, and shape of block desired. The pan here illustrated is especially designed for blocking sides of bacon and thus is relatively shallow and is rectangular.

A vertical compressor partition 12, extending transversely within one end portion of the pan, is adjustable lengthwise of the pan. As illustrated, this is a length of ordinary right-angle bar, resting on its horizontal flange 12' which has two pins 14 aligned along the longitudinal axis of the pan and projecting down through a slot 16 in the pan bottom, on the outside of which latter they are headed. These provide a sliding connection between partition 12 and pan 10. On the vertical part of the partition 12 two laterally spreading bolts 18 are held by means of the pin and slot connections 20. Each has a rearward projecting finger catch 22, and both are urged apart, by a central spring 24 interposed between them, to enter any of a series of perforations 26 in the side walls of the pan 10, thus to lock the compressor in selected positions. By pinching together the finger pieces 22, the bolts 18 may be withdrawn, and, using these finger pieces as a handle, the compressor may be shifted as desired. When the finger pieces are released, the bolts will snap into the suitable pair of the wall perforations 26 to lock the compressor in the new location.

Preferably I face this partition 12 with a meat-margin-engaging transverse strip 27 which is vertically loose. This may be an angle bar whose vertical flange is against the said partition and whose horizontal flange projects forward in position to engage over the adjacent marginal portion of a piece of bacon in the pan. A tongue 28 at each end of the vertical flange of this adjustable strip 27 is bent backward into a hook form and engages in a vertically elongated notch 29 cut in the adjacent vertical end of the partition 12. The notch lets the adjustable strip move freely, vertically, within limits.

The cover 30 may be of sheet metal, as the pan, and has end flanges 32 extending downward, adapted to fit loosely within the pan 10. On its top, upstanding ribs 34 extend longitudinally of the cover and constitute supports by which the weight of another pan, resting upon it in a stack, is transmitted directly to the meat on which the cover 30 is resting. They rise high enough to keep the upper pan from resting down on the sides of the pan below, even though this cover may have settled down low into the under pan because of thinness of the meat therein. Ventilation perforations 36 in the cover permit gases to escape from various parts of the meat mass while undergoing compression.

The preferred style of construction thus described is notable as providing a meat pressing surface, which is permanently plane, yet is made of material of light weight and at relatively small cost for material and for manufacture. The cover thus described may be made from a single sheet of metal whose edge flaps are folded over upon the top so as to make the ridges 34 double thick, the metal of the cover between them and the side edges being also double thick, so that no bending of the cover in the direction of its length is possible under any conditions of normal use or ordinary operative abuse. The bending down of the flanges 32 at the end of the same sheet gives a corresponding stiffness cross wise. The ridges 34 constitute convenient means for lifting and handling the cover; and the flanges 32 by projecting down within the pan serve the additional function of interlocking means, so that, even though the unevenness or the thickness of the contained meat be such as to tilt or raise the general plane of the cover above the side walls, nevertheless one or both of these end flanges, by sticking down within the end wall of the pan, will prevent the cover with the load above it from sliding off. This helps hold the stack of blockers in due verticality. The locating of the ridges 34 at a little distance inward from the edges results in giving easy freedom of action in depositing the blockers one on another; and this would be a means of rendering the cover adequately stiff even though the end flanges were omitted.

When blockers are assembled in a stack, these longitudinal ridges 34 intervene between the successive body portions; and they might, if preferred, be attached to the under side of the pan 10, or integral therewith, instead of being on the upper side of the cover as illustrated. Or, if both the ridges and the cover were omitted, each pan bottom might rest directly on the meat in the pan below, each bottom serving as a cover for the meat underneath it, and preferably having a part adapted to fit within the upper portion of the lower pan. The ribs 34 however have the merit that they provide a space which is convenient for escape of gases from the meat; holes being cut through the cover as may be convenient for that purpose.

In use, the compressor partition 12 is first to be withdrawn a suitable distance to allow a piece of bacon, known as a side or belly, to be inserted in the pan 10, which pan will have been chosen of such a size that its width conforms to the size of slicing machine that is to be used. But the size of the piece of meat need not thus conform. If, for instance, a piece of bacon 12 inches wide is at hand, and a 10 inch slicer is to be used, the piece need not be trimmed down to 10 inches. But it may be put into a pan 10 inches wide, leaving the body of the piece of meat bowed upward as much as necessary; and, the meat being in a somewhat plastic state, the portion thus bowed upward may then be pressed down with the fingers as far as it will go easily. Then the compressor will be manually thrust against the end of the meat piece, so as to flatten the end face of the meat piece, which usually is irregular, round or pointed; and this will be left locked so as to resist expanding pressure from within. Preliminarily the loose marginal cover 27 will have been elevated and let drop on the meat. Then the cover 30 may be put on, resting down on the meat. This compresses the latter somewhat by its own weight, but other pressure or weight may be added as desired. I prefer to handle the blockers in stacks, so that each blocker may be subjected to the compressing weight of all other blockers, stacked above it. Each individual blocker, when filled, is placed on a truck; and stacks of blockers are built up on the truck for conveyance to the freezing chamber. While the stacks are being completed those blockers which were first placed on the truck are undergoing pressure from top, sides and ends,—originating in the top pressure and arising from the plasticity of the meat and the resistance by the side and end walls. And as the meat yields under this pressure the contents are being gradually blocked into the shape of the pan; so that any bowed up portions are flattened, and gas in the meat may work out, and any spaces in the pan that were originally not filled by the piece of meat become gradually filled as the mass of meat, under influence of the pressure from above is forced plastically and laterally into such spaces, thereby acquiring the shape of a block. As each cover is loose within its pan, it rests down only on the high points in thickness of the meat, wherever those may happen to be; and it applies the whole pressure of the weight of the stack which is above it, metal and meat, to those high points; and thus it tends to reduce them to an equality of level with the other parts of the top surface of the piece of meat. When the truck has been taken into the freezing chamber the blockers, with their contents remaining untouched, may conveniently be removed from the truck one at a time and be re-stacked on shelves in the freezing chamber, with the blockers which were at the tops of the stacks becoming the bottoms of stacks; and each thus undergoes the same heavy pressure that the bottom blocker of its stack had when on the truck. As some time passes before the meat becomes stiff in the freezer, this pressure has time in which to do effective work in those blockers which have not previously enjoyed so great pressure.

With progress of the freezing, each piece of meat becomes stiff in the size and shape which it then occupies; and thus it may remain either for a few hours or for many days.

When a piece is to be prepared further for market by being sliced, the blocker containing it is removed from the freezing chamber. Heat of normal atmosphere passes through the metal of the blocker, on all sides of the meat, and in a very short time this melts whatever ice may have formed therein between meat and metal. Thereupon the piece of meat can be easily tipped out; and while still retaining its block form it may be put into the slicing machine, with the result that each slice will be approximately rectangular.

If the block of meat be thicker at one end than at the other, this does not detract from its saleability as grade 1 meat. Each individual slice, by itself, is shapely; and the fact that the shape is larger or smaller does not detract.

It is a net result of the use of the apparatus that each piece of meat when sliced after being blocked is substantially rectangular in shape, with no irregularities to be trimmed off, and thus the entire poundage is in shape to be sliced uniformly and to be marketed as Number 1 grade bacon.

The apparatus can be used without the partition 12 being moved as a compressive plunger as above described. In that case the partition may be rigid at, or be adjusted preliminarily to the location in the pan corresponding to the length dimension it is desired that a particular meat block shall have. The irregular piece of meat being then placed in the pan, and being bowed upward because it is too long to lie flat, a compression of the mass may be had by slowly pressing the bowed part down, with gradual re-shaping of the whole; and the meat can be thus worked into flatness with the desired square ends.

In Figures 6–8 I illustrate a reducing device by which a standard size of blocker, for example, one 10" wide, may be converted so as to make 9" or 8" bacon blocks. For this purpose I provide removable vertically extensible partitions 40, which constitute fillers. These may be inserted at one or both sides of a pan 10 to reduce the width dimension of the blocking space either one or two inches. Each partition 40 is extensible in length, and also vertically in height, to accommodate varying lengths and thicknesses of meat. To this end the partition section 42 overlaps and is slidable longitudinally with respect to section 44: and each of these sections has a turned back leg 42', 44' adapted to space the partition the desired one inch from the pan wall. A section 46 is slidable vertically and loosely on the section 42, and a section 48 is similarly on section 44, both 46 and 48 having marginal flanges adapted to overlie horizontally and to engage the piece of meat in the pan. Thus a partition 40 may be contracted or extended lengthwise of the meat to suit a particular need, and its margin flange may be elevated sufficiently to engage over the edge of the meat regardless of variations in the thickness of the piece. Then with the transverse partition 12 properly set, the cover may be applied and the piece blocked as before described. In this way a single size of pan 10 can be reduced so as to serve for either of three different groups of bacon sizes, such as those approximating 10", those approximating 9" and those approximating 8" in width, while a wide range of lengths and thicknesses can be accommodated as heretofore described.

I claim as my invention:

1. Apparatus for blocking a side of bacon, comprising a rectangular container for receiving the bacon; a compressing cover; a compressor under the cover, manually adjustable to positions making the container to be of various lengths for compressing engagement with an edge of the contained piece of bacon; and a horizontal strip carried by and movable vertically on the said compressor, for overlying and confining the margin of the piece of bacon which is adjacent to the compressor.

2. Meat blocking apparatus, comprising a container and a cover fitting loosely therein; said cover being of flat sheet metal, with each side edge turned over upon itself forming stiffened marginal edges for the cover and then turned sharply upward and then downward against itself, forming vertical, longitudinally extending ribs, which constitute both handles for the cover, stiffeners for the cover, and supports for a container stacked above.

3. A meat pressing device comprising a bottom, end walls and side walls, a movable partition intermediate the end walls, means for locking the partition in adjusted position, the partition being of less height than the walls of the container, a vertically movable extension carried by the movable partition, said extension having a horizontal flange and its upper edge being adapted to overlie the material to be pressed, and a cover of such dimensions as to fit between the walls of the container and to rest upon said extension in all positions of adjustment of the movable partition.

4. A device for pressing meat comprising a bottom, side walls, an end wall, a vertically extensible partition wall disposed between the side walls to form a chamber to receive meat to be pressed, releasable means for holding said partition wall in different positions longitudinally of the side walls for varying the longitudinal dimensions of said chamber, means cooperating with said partition wall for supporting the latter in vertically extended position on the meat to be pressed so that said partition wall may be effective for confining the adjacent end portion of a piece of meat during compression thereof, and means for applying pressure over the upper surface of a piece of meat in said chamber.

5. Meat blocking apparatus, comprising a container for the meat, having parallel side walls with plane interior faces, and parallel end walls extending rectangularly between the said side walls; one of said end walls being adjustable along the side walls; and means effective at each end of said adjustable wall, outside of the plane of the inner face of said wall, for holding said wall in selected positions, thereby to adjust the size of the interior rectangular space defined by said walls without there being interior projections disturbing the regularity of the meat space, said means for holding the said adjustable end wall being at opposite ends of said adjustable end wall and providing inter-engagements there, between that adjustable end wall and each side wall at top portions and at bottom portions of the height of said adjustable end wall; whereby top and bottom edge portions of said adjustable end wall are supported with the plane of that wall at a predetermined angle to the bottom of the container regardless of the distribution of endwise pressure on the adjustable end wall.

JOSEPH L. WILDE.